United States Patent
Ozaki et al.

(10) Patent No.: US 8,566,009 B2
(45) Date of Patent: Oct. 22, 2013

(54) APPARATUS AND METHOD FOR CONTROLLING TRAVEL OF VEHICLES

(75) Inventors: Tomonori Ozaki, Kanagawa (JP); Koji Takeda, Tama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/508,570

(22) PCT Filed: Nov. 8, 2010

(86) PCT No.: PCT/JP2010/069854
§ 371 (c)(1),
(2), (4) Date: May 30, 2012

(87) PCT Pub. No.: WO2011/055823
PCT Pub. Date: May 12, 2011

(65) Prior Publication Data
US 2012/0330540 A1    Dec. 27, 2012

(30) Foreign Application Priority Data
Nov. 9, 2009  (JP) ................. 2009-256147

(51) Int. Cl.
  *G08G 1/00*    (2006.01)
  *G05D 1/00*    (2006.01)
  *G05B 19/4061* (2006.01)

(52) U.S. Cl.
  USPC ........... 701/117; 700/112; 700/248; 700/255; 701/2; 701/26

(58) Field of Classification Search
  USPC .......... 180/167, 168; 700/100, 101, 112, 113, 700/245, 248, 249, 253, 255; 701/2, 19, 23, 701/25, 26, 117, 300, 301, 409, 410, 422, 701/534; 901/1, 50
  See application file for complete search history.

(56) References Cited

U.S. PATENT DOCUMENTS 5,625,559 A * 4/1997 Egawa .......................... 701/117
2007/0293996 A1* 12/2007 Mori et al. ..................... 701/23

FOREIGN PATENT DOCUMENTS

JP  02-096809 A  4/1990
JP  09-198134 A  7/1997
JP  10-222227 A  8/1998

(Continued)

OTHER PUBLICATIONS

The International Search Report of the International Searching Authority mailed Nov. 30, 2010 for the corresponding international application No. PCT/JP2010/069854 (English translation).

*Primary Examiner* — Mary Cheung
*Assistant Examiner* — Rodney Butler
(74) *Attorney, Agent, or Firm* — Posz Law Group, PLC

(57) ABSTRACT

A method for causing vehicles to travel improves work efficiency by minimizing stop time of the vehicles while avoiding deadlock, wherein reservation-requested routes are generated for the respective vehicles. The reservation-requested routes are parts of travel routes and between the current positions and travel stop positions, and are generated in so that a position not interfering with an interference region shown on a map and the terminal position of the reservation-requested routes for other vehicles becomes a terminal. Then, an already reserved route, is generated on conditions that the reservation-requested route for the vehicle does not interfere with the already reserved routes for the other vehicles and that deadlock does not occur. Then, the respective vehicles are controlled to travel from the current positions to the terminal positions of the already reserved routes.

7 Claims, 12 Drawing Sheets

TOP VIEW OF WORK SITE

(56) References Cited

FOREIGN PATENT DOCUMENTS

| | | | |
|---|---|---|---|
| JP | 11143536 A * | 5/1999 | |
| JP | 11-259131 A | 9/1999 | |
| JP | 2001-109519 A | 4/2001 | |
| JP | 2002-170198 A | 6/2002 | |
| JP | 2007226835 A * | 9/2007 | |
| JP | 2008-134744 A | 6/2008 | |
| JP | 2010-160696 A | 7/2010 | |

* cited by examiner

BLOCK DIAGRAM OF TRAVEL CONTROL APPARATUS

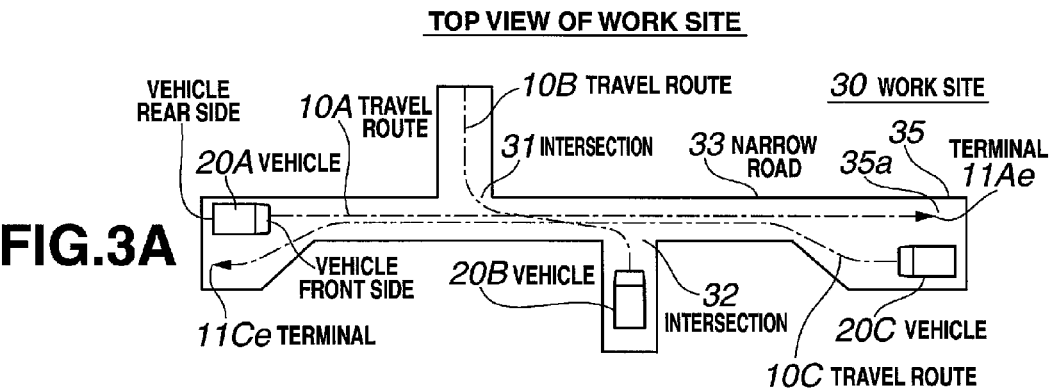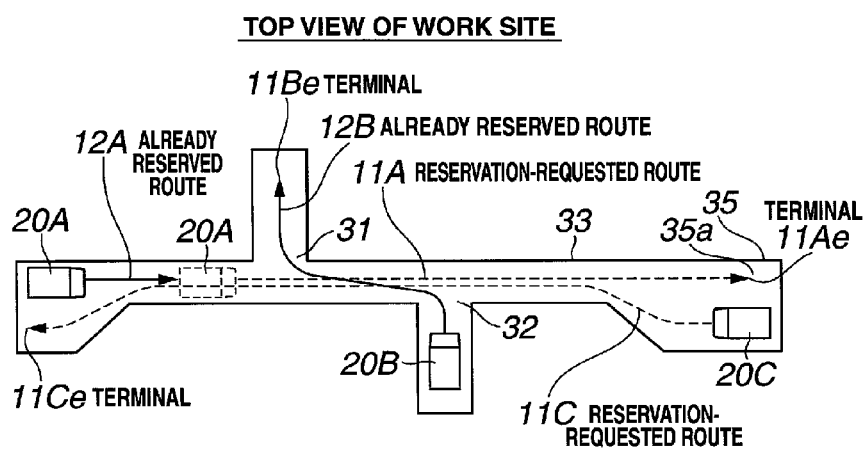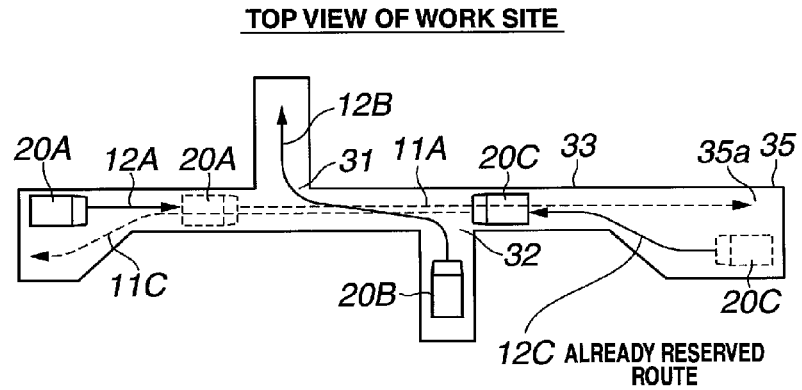

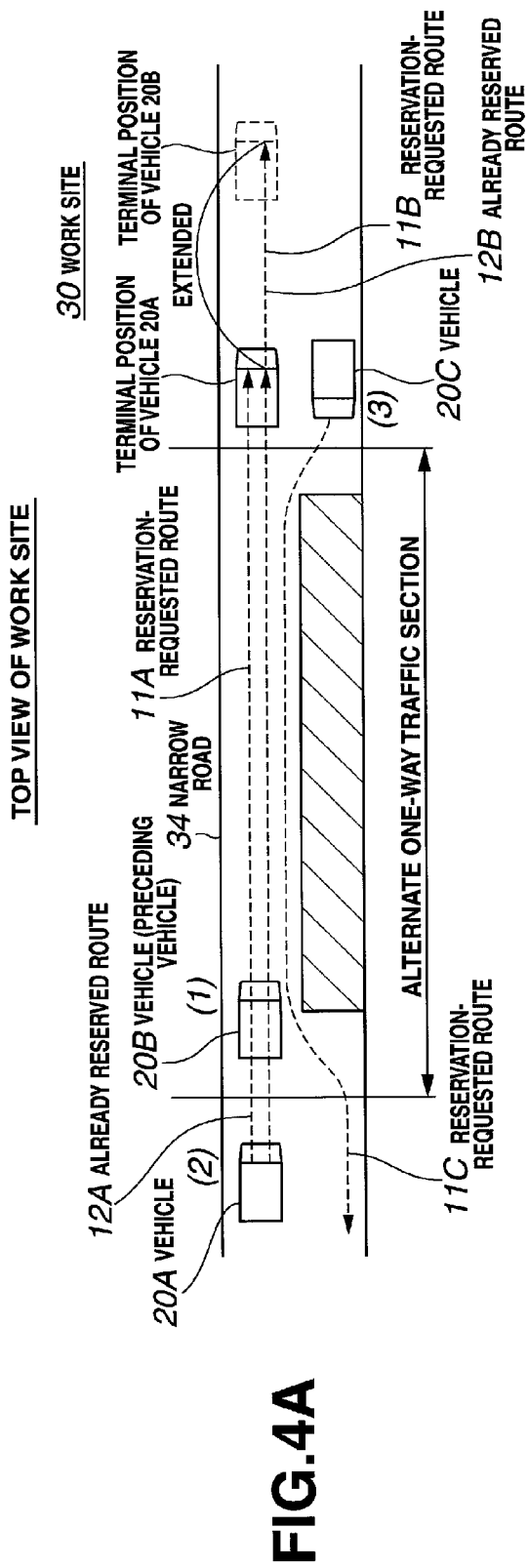
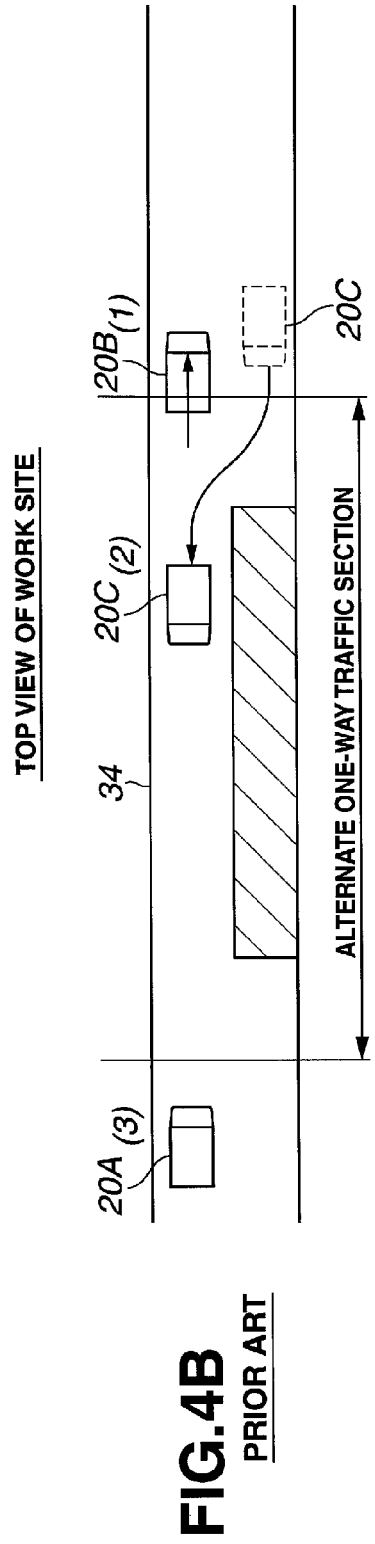
FIG.4A
FIG.4B PRIOR ART

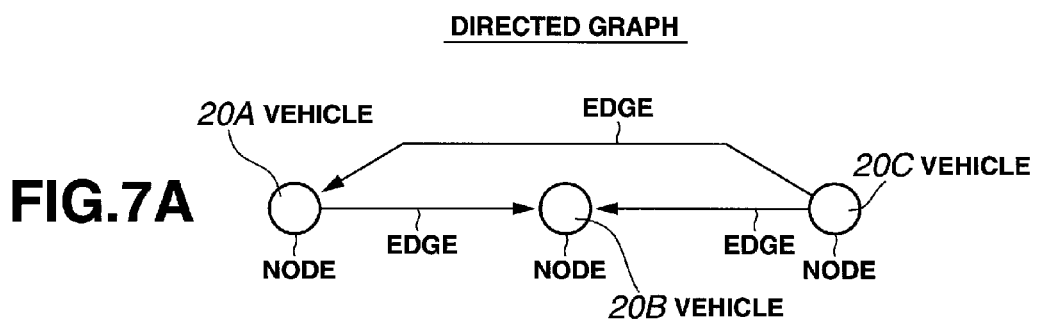
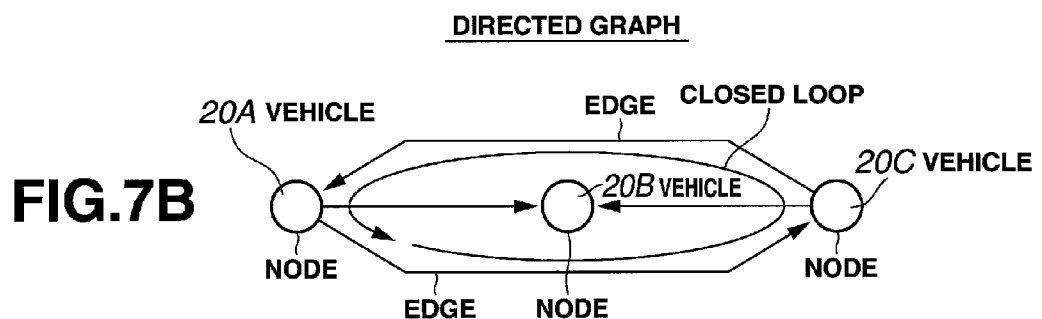

APPARATUS AND METHOD FOR CONTROLLING TRAVEL OF VEHICLES

CROSS REFERENCE TO RELATED APPLICATIONS

This application is a U.S. national stage application of PCT/JP2010/069854 filed on Nov. 8, 2010, and claims priority to, and incorporates by reference, Japanese Patent Application No. 2009-256147 filed on Nov. 9, 2009.

TECHNICAL FIELD

The present invention relates to an apparatus and method for controlling unmanned vehicles to travel, and particularly a travel control apparatus and method that can avoid deadlock when a plurality of unmanned vehicles are caused to travel along respective travel routes.

BACKGROUND

At large work sites such as rock quarries and mines, an unmanned vehicle travelling system is introduced to operate unmanned dump trucks instead of manned vehicles such as manned off-road dump trucks in order to improve productivity by avoiding an accident due to workers' fatigue, manpower saving, and extension of working hours at the time of sediment transportation work.

The work site where the unmanned dump trucks travel includes respective areas such as a loading place, an earth removal place and the like. Each area is connected by a maintained carrying path which is called a whole road and by an intersection or a lead-in path, which is called an access road, extended from the whole road to each area.

The work sites have a plurality of unmanned dump trucks, and the respective unmanned dump trucks travel to their destinations along travel routes which are independently generated depending on respective purposes. But, the respective travel routes might interfere with other travel routes at an intersection or an alternate one-way traffic section. If an unmanned dump truck stops in a region interfering with another travel route, the operation of the respective unmanned dump trucks might fall in deadlock. In this specification, the situation "the vehicle operation falls in a deadlock state" is called "deadlock".

According to a conventional technology, the travelling system that causes a plurality of vehicles to travel did not consider a problem of deadlock at all or was limited to a special case only even if the problem was considered.

In Patent Document 1, the travel route is divided into respective segments, a position of an unmanned vehicle is reported to a monitoring device every time the unmanned vehicle passes through each segment, and the monitoring device which has received the position report checks that there is no interference and gives the unmanned vehicle approval to travel through the next segment. If the unmanned vehicle cannot receive travel permission, the unmanned vehicle is automatically stopped. And, if unmanned vehicles are located adjacent to each other, communications are mutually made between them to check that the travel routes are not interfered with each other.

In Patent Document 2, unmanned vehicles are alternately caused to travel through the alternate one-way traffic section, so that the unmanned vehicles are prevented from interfering with each other.

Patent Document 3 relates to a traffic control system for manned vehicles, and when a traffic signal at the intersection in front of a vehicle changes its color, it is automatically judged whether the vehicle should pass through the intersection or should stop before the intersection, thereby preventing interference at the intersection.

Patent Document 4 that causes unmanned forklifts to travel along indoor travel routes, and generates travel routes including a turning route where the unmanned forklifts are turned such that they do not interfere with facilities such as indoor walls and the like.

Patent Document 5 prevents interference between an unmanned dump truck and a loader by prohibiting the unmanned dump truck from entering into a loading area having the loader therein.

Patent Document 1: Japanese Patent Application Laid-Open No. H10-222227
Patent Document 2: Japanese Patent Application Laid-Open No. 2001-109519
Patent Document 3: Japanese Patent Application Laid-Open No. 2002-170198
Patent Document 4: Japanese Patent Application Laid-Open No. H2-96809
Patent Document 5: Japanese Patent Application Laid-Open No. H9-198134

Patent Document 1 merely divides into segments and does not consider deadlock in an interference region such as an alternate one-way traffic section or an intersection, so that there is a possibility that deadlock occurs in the alternate one-way traffic section or the intersection to immobilize unmanned vehicles.

Patent Document 2 can prevent interference between unmanned vehicles in the alternate one-way traffic section only, but since it does not consider interference in another intersection or a more complex interference region, deadlock might be caused in such an interference region.

Patent Document 3 is a system assuming a manned vehicle and cannot be applied to an unmanned vehicle traveling system that originally does not estimate visual recognition of a signal. And, interference can be prevented at an intersection where traffic signals are provided, but deadlock might be caused in such an interference region because interference in an alternate one-way traffic section or a complex interference region is not considered.

Patent Document 4 can prevent one unmanned forklift from interfering with an indoor facility, but since interference among a plurality of vehicles outdoors is not considered at all, it cannot be applied to an unmanned vehicle travel system by which a plurality of unmanned vehicles are caused to travel outdoors.

Patent Document 5 can prevent interference between an unmanned dump truck and a loader in a loading area, but deadlock which might be caused between the unmanned dump trucks in an interference region such as an alternate one-way traffic section or an intersection is not considered at all. Therefore, there is a possibility that deadlock occurs in the alternate one-way traffic section or the intersection, and the unmanned dump trucks are immobilized.

SUMMARY

The present invention has been made in view of the above circumstances and makes it possible to avoid deadlock in the case where a plurality of unmanned vehicles are caused to travel along respective travel routes.

In addition, the present invention improves work efficiency by minimizing stop time of the vehicles while avoiding deadlock.

first invention is a travel control apparatus for unmanned vehicles, which causes a plurality of unmanned vehicles to travel along respective travel routes, comprising:

a reservation-requested route generation section which generates, for respective vehicles, reservation-requested routes that are parts of travel routes from current positions to travel stop positions and that have, as terminal positions, positions which do not interfere with an interference region on a map and terminal positions of reservation-requested routes for other vehicles, a deadlock judgment section which judges for respective vehicles that the reservation-requested route for the own vehicle does not interfere with already reserved routes for the other vehicles, and that deadlock does not occur when it is assumed that an already reserved route, which has the reservation-requested route for the own vehicle already reserved, is generated, an already reserved route generation section which generates the already reserved route with the reservation-requested route for the own vehicle already reserved, and a travel control section which controls respective vehicles to travel from current positions to terminal positions of already reserved routes.

A second invention is a travel control method for unmanned vehicles, which causes a plurality of unmanned vehicles to travel along respective travel routes, comprising:

a reservation-requested route generation step of generating, for respective vehicles, reservation-requested routes that are parts of travel routes from current positions to travel stop positions and that have, as terminal position, positions which do not interfere with an interference region on a map and terminal positions of reservation-requested routes for other vehicles, an already reserved route generation step of generating an already reserved route with the reservation-requested route for the own vehicle already reserved on conditions that for respective vehicles, the reservation-requested route for the own vehicle does not interfere with the already reserved routes for the other vehicles, and that deadlock does not occur when it is assumed that the already reserved route, which has the reservation-requested route for the own vehicle already reserved, is generated, and a travel control step of controlling the respective vehicles to travel from current positions to terminal positions of already reserved routes.

A third invention according to the second invention is characterized in that, in the already reserved route generation step, when the reservation-requested route for the own vehicle interferes with the reservation-requested routes for the other vehicles, an already reserved route, which has the reservation-requested route for the own vehicle already reserved, is generated on conditions that the own vehicle has a priority higher than the other vehicles.

A fourth invention according to the second invention is characterized in that, in the already reserved route generation step, it is assumed that the already reserved route has been generated with the reservation-requested route for the own vehicle already reserved, a directed graph of an arrow directed from the vehicle, for which the reservation-requested route has been generated, to the vehicle, for which an already reserved route interfering with the reservation-requested route has been generated, is generated, and it is judged whether or not deadlock occurs depending on whether or not the generated directed graph has a closed loop.

A fifth invention according to the second invention is characterized in that, in the already reserved route generation step, when it is judged that the reservation-requested route for the own vehicle interferes with the already reserved route for the other vehicle, the other vehicle is demanded to cancel the interfered portion on the already reserved route for the other vehicle.

A sixth invention according to the fifth invention is characterized in that, when it is judged that the reservation-requested route for the own vehicle interferes with the already reserved route for the other vehicle, the other vehicle is demanded to stop at a position before a position where the other vehicle interferes with the reservation-requested route for the own vehicle.

A seventh invention according to the second invention is characterized in that, in the reservation-requested route generation step, when the terminal position of the reservation-requested route for the own vehicle interferes with the terminal positions of the reservation-requested routes for the other vehicles, the terminal positions of the reservation-requested routes for the other vehicles are extended to a non-interfering position.

The present invention is practiced as follows.

(Reservation-Requested Route Generation Step)

First, reservation-requested routes 11A, 11B and 11C are generated for respective unmanned vehicles (hereinafter abbreviated as vehicles where appropriate) 20A, 20B and 20C. Here, the reservation-requested routes 11 (11A, 11B and 11C) are generated to become routes which are on a travel route 10 and from a current position to a travel stop position, and have as a terminal a position which does not interfere with an interference region on a map and a terminal position of the reservation-requested routes 11 for the other vehicles 20. In this specification, when a particular vehicle is determined to be an "own vehicle", the other vehicle is determined as the "other vehicle" from the view point of the "own vehicle".

Here, the interference region on the map is a region that if a vehicle 20 stops in the interference region, it might disturb the other vehicles 20 from traveling in order to prevent colliding, and that includes an intersection, an alternate one-way traffic section and the like. And, the interference region on the map is not necessarily fixed and might be variable with time. For example, when a loading machine such as a hydraulic shovel moves at a loading place, a loading position is changed, and the interference region on the map changes accordingly.

If the terminal position of the reservation-requested route 11A for the own vehicle 20A interferes with the terminal position of the reservation-requested route 11B for the other vehicle 20B, the terminal position of the reservation-requested route 11B for the other vehicle 20B is extended to a non-interference position (seventh invention).

(Already Reserved Route Generation Step)

Then, for each of the vehicles 20A, 20B and 20C, it is judged that the reservation-requested route 11 for the own vehicle 20 does not interfere with already reserved routes 12 for the other vehicles 20 and that deadlock does not occur when it is assumed that the already reserved routes 12 are generated with the reservation-requested route 11 for the own vehicle 20 already reserved. On condition that the above judgment has been made, processing is performed to generate the already reserved route 12 which has the reservation-requested route 11 for the own vehicle 20 already reserved.

Here, if the reservation-requested route 11A for the own vehicle 20A interferes with the reservation-requested route 11B for the other vehicle 20B, an already reserved route 12A is generated with the reservation-requested route 11A for the own vehicle 20A already reserved on condition that the own vehicle 20A has a priority higher than the other vehicle 20B (third invention).

It is judged whether or not deadlock occurs by assuming that the already reserved route 12 has been generated with the reservation-requested route 11 for the own vehicle 20 already reserved, generating a directed graph of an arrow which is directed from the vehicle 20, for which the reservation-requested route 11 has been generated, to the vehicle 20 for which the already reserved route 12 which interferes with the reservation-requested route 11 has been generated, and depending on whether or not the generated directed graph has a closed loop (fourth invention).

When it is judged that the reservation-requested route 11A for the own vehicle 20A interferes with an already reserved route 12B for the other vehicle 20B, a demand can be made to the other vehicle that the interfered portion on the already reserved route 12B for the other vehicle 20B is canceled (fifth invention). For example, it can be demanded to the other vehicle 20B that the other vehicle 20B stops at a position before the position where the other vehicle 20B interferes with the reservation-requested route 11A for the own vehicle 20A (sixth invention).

(Travel Control Step)

Then, the respective vehicles 20A, 20B and 10C are controlled to travel from the current positions to the terminal positions of the already reserved routes 12A, 12B and 12C.

According to the present invention, deadlock (stationary state) is avoided. In addition, the vehicle stop time can be reduced, and work efficiency is improved.

BRIEF DESCRIPTION OF THE DRAWINGS

FIGS. 3A, 3B and 3C are diagrams to exemplify a region of a part of a work site and used to explain a situation that a plurality of unmanned vehicles travel.

FIG. 4A is a diagram to exemplify a region of another part of the work site and used to explain a situation that a plurality of unmanned vehicles travel, and FIG. 4B is a diagram showing a comparative example for comparison with FIG. 4A.

FIGS. 7A and 7B are diagrams showing directed graphs which are mathematical models corresponding to the respective states of FIGS. 3B and 3C.

DETAILED DESCRIPTION

Embodiments of a travel control apparatus for unmanned vehicles and a travel control method according to the present invention are described below with reference to the drawings. In the following embodiments, unmanned off-road dump trucks are estimated as unmanned vehicles.

A work site includes respective areas such as a loading place, an earth removal place, a gas station, and a parking lot. Each area is connected by a maintained carrying path which is called a whole road and by an intersection or a lead-in path, which is called an access road, extended from the whole road to each area.

As shown in FIG. 3A, a work site 30 has a plurality of unmanned vehicles (hereinafter called as the vehicles in this embodiment) 20A, 20B, 20C . . . . The plurality of vehicles 20A, 20B, 20C . . . are respectively determined to have travel routes 10A, 10B, 10C . . . .

In this specification, the plurality of vehicles 20A, 20B, 20C . . . are collectively called as the "vehicles 20" when they are not discriminated, and the travel routes 10A, 10B, 10C . . . are collectively called as the "travel routes 10" when they are not discriminated. In addition, when the reservation-requested routes and the already reserved routes which are described later are discriminated for the plurality of vehicles 20A, 20B, 20C . . . respectively, they are determined as the reservation-requested routes 11A, 11B, 11C . . . and the already reserved routes 12A, 12B, 12C . . . , but when they are not discriminated, they are collectively called as the "reservation-requested routes 11" and the "already reserved routes 12".

The vehicle 20 is a front wheel steering vehicle with front and rear wheels, and it has a driver seat (cab) disposed on a front portion of the vehicle body, and a loading platform (vessel and body) on a rear portion of the vehicle body (see the vehicle 20A of FIG. 3A).

Figure 1:
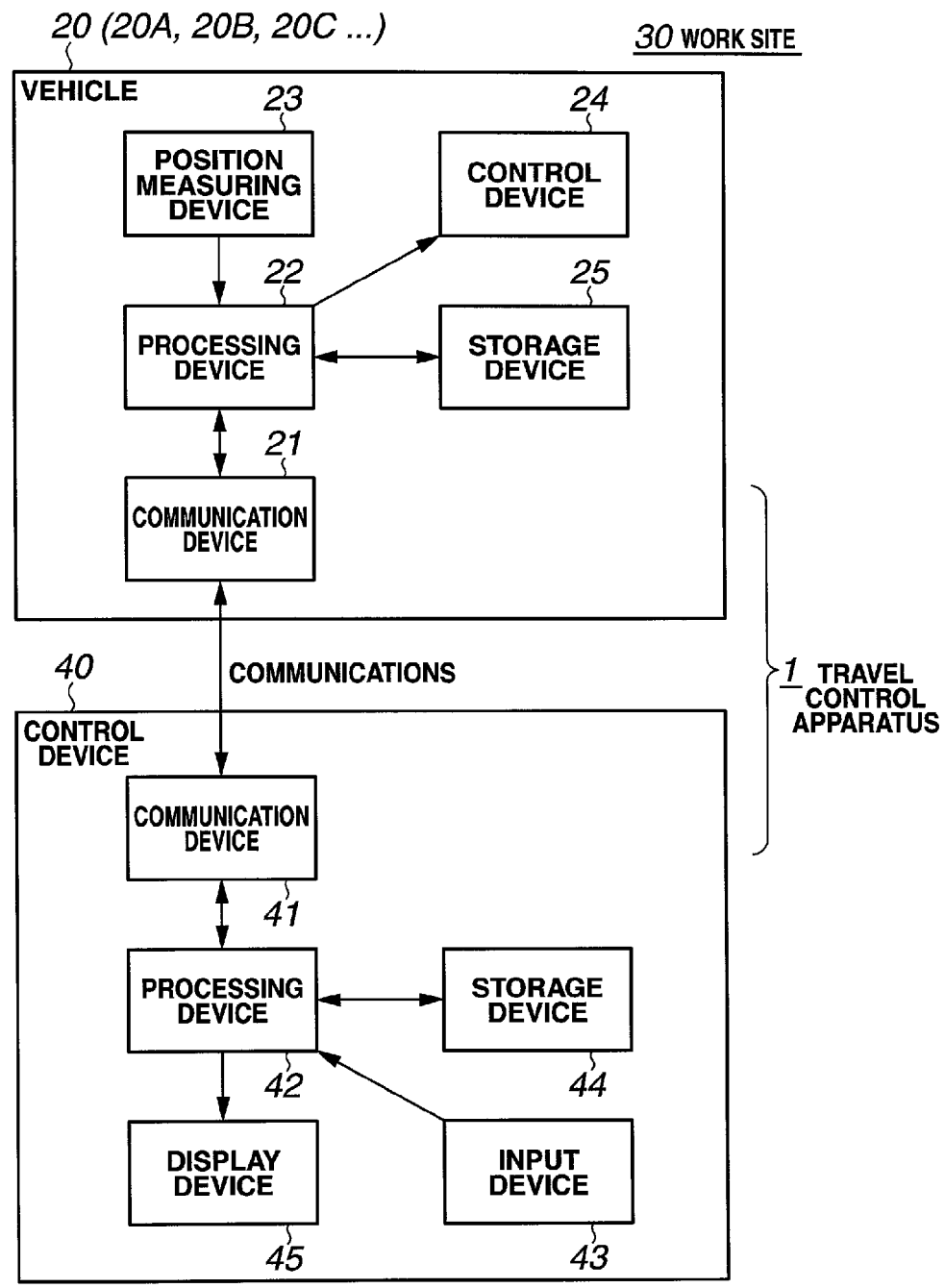
FIG. 1 is a block diagram of the travel control apparatus of an embodiment.

FIG. 1 shows a block diagram of a travel control apparatus 1 of the embodiment.

The work site 30 is provided with a control device 40 for managing and monitoring multiple vehicles 20A, 20B, 20C . . . . The control device 40 is provided with a communication device 41, a processing device 42, an input device 43, a storage device 44 and a display device 45.

On the other hand, the vehicles 20 (20A, 20B, 20C . . . ) are provided with a communication device 21, a processing device 22, a position measuring device 23, a control device 24 and a storage device 25.

The position measuring device 23 of the vehicle 20 measures the position of the own vehicle. As position measuring means, for example, a tire rotation speed sensor and a gyroscope mounted on the vehicle 20 are used. Based on the output signal of the tire rotation speed sensor and the output signal of the gyroscope, the vehicle position is measured. The vehicle position may also be measured by receiving by a GPS antenna the signal transmitted from a GPS satellite and detecting by a GPS sensor. In addition, the vehicle position may be measured by a method using a laser sensor, a visual camera or the like.

The vehicle position information measured on the vehicle 20 is processed by the processing device 22 and transmitted to the control device 40 via the communication device 21.

The communication device 41 of the control device 40 receives the vehicle position information transmitted from the plurality of vehicles 20. The received vehicle position information is used for managing and monitoring the plurality of vehicles 20 and for generating the travel route 10, the reservation-requested route 11, and the already reserved route 12. Here, the travel route 10 is a region which is determined according to the data on a course formed in a site such as a mine and a size of the vehicle 20. A method of generating data on the travel route includes 1) a method of teaching by previously operating to travel the vehicle 20, and 2) a method of obtaining data on a road shoulder by measuring or the like.

The input device 43 of the control device 40 is input with data required for generation of the travel routes 10, the reservation-requested routes 11, and the already reserved routes 12, such as data on the map of the work site 30 where the vehicles 20 must travel, and data on destinations of the vehicles 20.

The processing device 42 of the control device 40 generates the travel routes 10 according to the vehicle position information transmitted from the vehicles 20, the input map data on the work site 30, and data on the destinations of the vehicles 20. In addition, the reservation-requested routes 11 and the already reserved routes 12 are generated according to the generated travel routes 10. In addition, travel instructions for traveling the vehicles 20 along the already reserved routes 12 on the travel routes 10 are generated. When information on the speeds of the vehicles 20 is required other than the vehicle position information in order to generate the above data, the vehicle speed information is determined appropriately by performing a temporal differentiation of the positions of the vehicles 20, or the like. And, the speed information of the vehicles 20 can also be obtained by the vehicle-mounted speed meter.

The information and travel instructions related to the generated already reserved routes 12 are transmitted to the vehicles 20 via the communication device 41.

The communication device 21 of the vehicle 20 receives the information and travel instructions on the already reserved routes 12 transmitted from the control device 40. The storage device 25 stores the information and travel instructions on the already reserved routes 12 transmitted from the control device 40.

The processing device 22 of the vehicle 20 generates a control instruction for traveling and steering the own vehicle 20 according to the information and travel instructions on the already reserved routes 12. The above control instructions are outputted to the control device 24. As a result, the control device 24 controls the travel and steering of the own vehicle 20. Thus, the vehicle 20 is traveled and steered along the already reserved route 12 on the travel route 10.

Figure 12A:
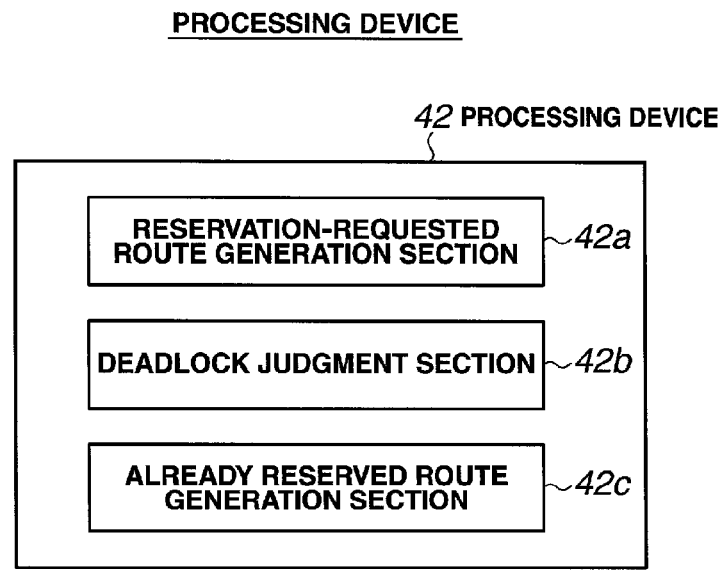
FIGS. 12A and 12B are diagrams exemplifying a structure of the processing device shown in FIG. 1.

In first and second embodiments below, a reservation-requested route generation section 42a of the processing device 42 of the control device 40 shown in FIG. 12A processes to generate the reservation-requested route 11 as described later, a deadlock judgment section 42b of the processing device 42 makes "a judgment that for the respective vehicles 20A, 20B and 20C, the reservation-requested route 11 for the own vehicle 20 does not interfere with the already reserved routes 12 for the other vehicles 20 and deadlock does not occur when it is assumed that the already reserved route 12, which has the reservation-requested route 11 for the own vehicle 20 already reserved, is generated" as described later, and an already reserved route generation section 42c of the processing device 42 processes to generate the already reserved route 12 on condition that the above judgment has been made.

The vehicle 20 is controlled to travel along the generated already reserved route 12, but this control to travel is performed by the processing device 42 of the control device 40, the processing device 22 of the vehicle 20 and the control device 24 of the vehicle 20. That is, the processing device 42 of the control device 40, the processing device 22 of the vehicle 20 and the control device 24 of the vehicle 20 configure a "travel control section".

First Embodiment

A first embodiment is described below with reference to the flow chart shown in FIG. 2.

Figure 2:
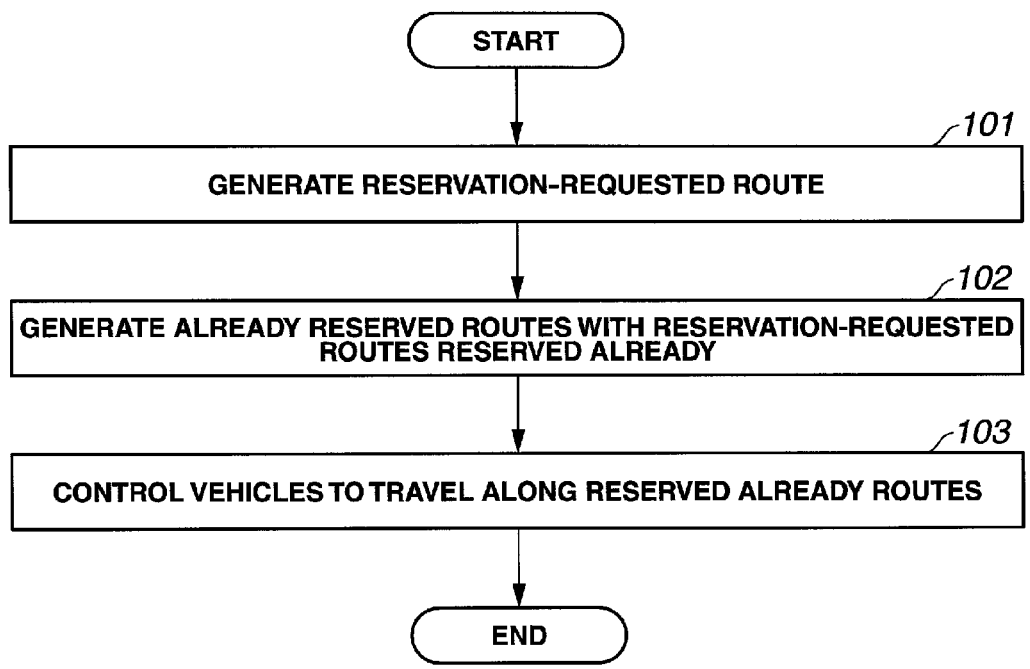
FIG. 2 is a flow chart used to illustrate a first embodiment and shows a procedure of processing performed by a control device.

FIG. 2 is a flow chart showing a procedure of processing performed by the control device 40.

FIGS. 3A, 3B and 3C exemplify a region of a part of the work site 30, showing a top view of a situation that three vehicles 20A, 20B and 20C travel along respective travel routes 10A, 10B and 10C. FIGS. 3A, 3B and 3C show a case that the travel routes 10A, 10B and 10C intersect at intersections 31 and 32, the travel routes 10A, 10B and 10C coexist on a narrow road 33, namely an alternate one-way traffic section 33 where two-way traffic is not allowed, and the travel routes 10A, 10B and 10C coexist at the intersections 31 and 32. The vehicle 20A and the vehicles 20B and 20C travel in opposite directions along the travel route 10A and the travel routes 10B and 10C. And, the vehicles 20A, 20B and 20C pass through the intersections 31 and 32.

FIGS. 3A, 3B and 3C are explanatory views of the first embodiment.

In FIG. 3A, the travel routes 10A, 10B and 10C are indicated by an alternate long and short dash line.

FIG. 3B is a view showing an example of a state that the reservation-requested routes and the already reserved routes are generated on the travel routes 10, indicating the reservation-requested routes 11A and 11C by a broken line and the already reserved routes 12A and 12B by a solid line.

FIG. 3C is a view showing another example of the state that the reservation-requested routes 11 and the already reserved routes 12 are generated on the travel routes 10, indicating the reservation-requested routes 11A and 11C by a broken line and the already reserved routes 12A, 12B and 12C by a solid line.

(Reservation-Requested Route Generation Step; Step 101 in FIG. 2)

First, the reservation-requested routes 11A, 11B and 11C are generated for the respective vehicles 20A, 20B and 20C according to the travel routes 10A, 10B and 10C. Here, the reservation-requested routes 11 are routes that are parts of the travel routes 10 extending from the current positions to the travel stop positions, and that are generated in such a manner that a position not interfering with an interference region shown on a map and the terminal position of the reservation-requested route 11 for the other vehicle 20 becomes a terminal. The interference region on the map is a region that, when the vehicle 20 stops in it, the other vehicle 20 might be disturbed from passing to avoid the vehicle 20 from colliding, and it is, for example, the intersections 31 and 32 as exemplified in FIG. 3, the narrow road (alternate one-way traffic section where two-way traffic is impossible) 33 as exemplified in FIG. 3, and the like.

A distance (called as the necessary distance in this specification) required for the reservation-requested routes 11 is a distance that a speed can be kept as high as possible and it is possible to stop safely. This necessary distance may be determined by calculating sequentially according to the current vehicle speed or may be determined as a fixed value previously. In the case that the fixed value is determined, it is desirable to set a long distance enough to keep the vehicle 20 travelling at a high speed.

Figure 5:
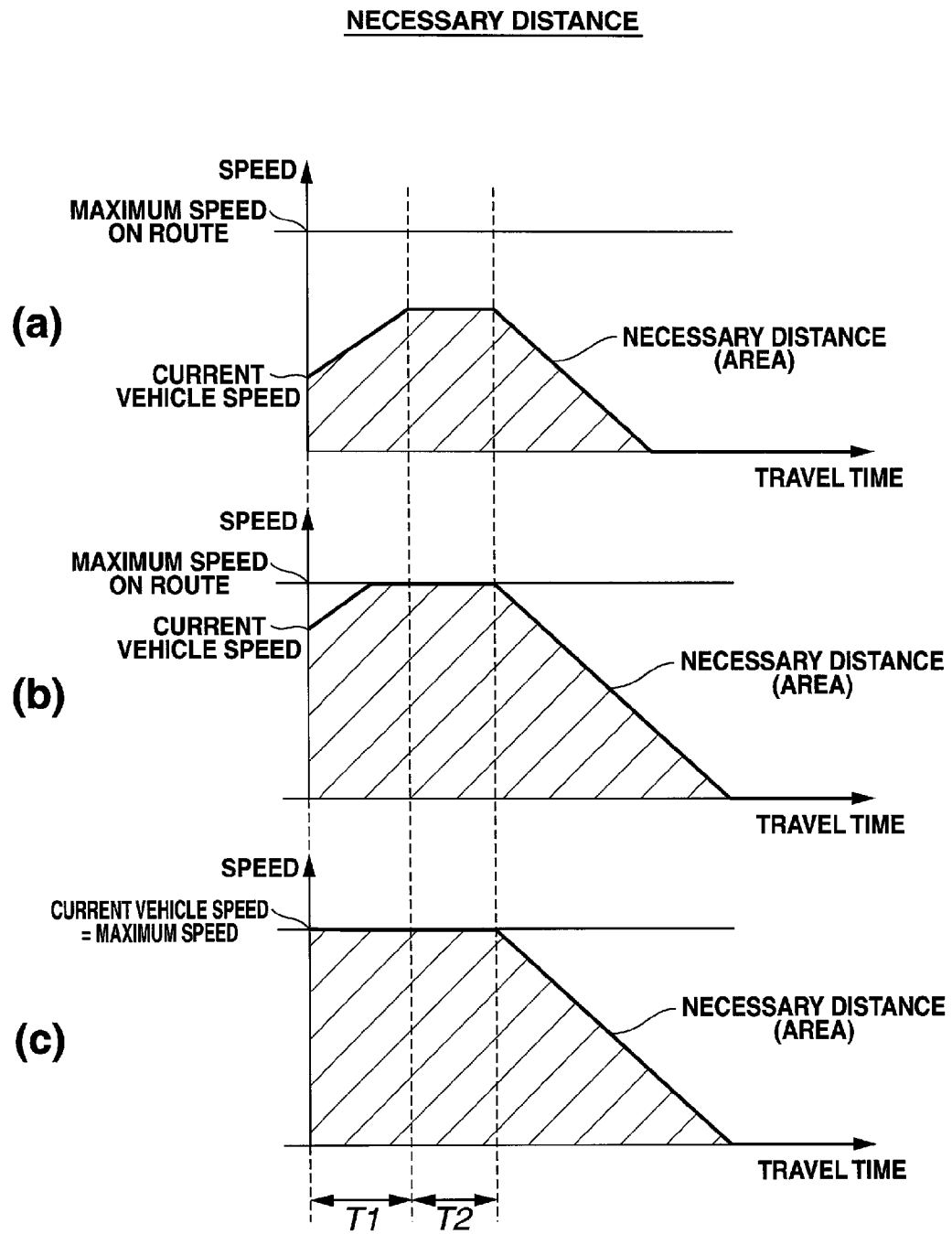
FIG. 5 is a diagram used to explain a calculation example to determine a necessary distance of a reservation-requested route by calculation.

FIG. 5 shows a calculation example to determine the necessary distance of the reservation-requested routes 11. The example shows that the current vehicle speed is increased toward the maximum speed on the travel route 10 in a fixed time T1, the speed after the acceleration is kept for a fixed time T2, and the speed is reduced to determine a distance to stop as the necessary distance. The maximum speed in FIG. 5 has the same significance as the limit speed of a so-called general motorway and is determined according to a shape (such as a curve) and a slope of the travel route and specific rules of the mine, and the like. And, the maximum speed is occasionally determined by determining an output power depending on the size of the vehicle 20 or providing the vehicle 20 itself with a limiter or the like to limit the speed. Acceleration and deceleration in FIG. 5 mean acceleration and deceleration involved in normal travelling of the vehicle 20, and they are set to fixed values in advance or determined according to route information such as a slope angle (inclination). The time to stop the vehicle in FIG. 5 can be calculated using the acceleration and deceleration of the vehicle 20 and the times T1 and T2.

FIG. 5 part (a) shows a case that the current vehicle speed is low, and the vehicle is decelerated to stop without reaching the maximum speed on the travel route 10.

FIG. 5 part (b) shows a case that the current vehicle speed is accelerated to the maximum speed on the travel route 10 and decelerated to stop.

FIG. 5 part (c) shows a case that the current vehicle speed that is the maximum speed on the travel route 10 is kept and then decelerated to stop.

The areas (areas obtained by integrating the vehicle speed with the time) indicated by diagonal lines in FIGS. 5 parts (a), (b) and (c) correspond to the necessary distance.

When the terminal position separated from the current position on the travel route 10 by the necessary distance is at the position in the interference region on the map, the necessary distance is extended so that the terminal position is not positioned in the interference region on the map.

For example, as shown in FIG. 3B, the reservation-requested routes 11A and 11C for the vehicles 20A and 20C are determined so that their terminal positions 11A$e$, 11B$e$ and 11C$e$ are not positioned in the intersections 31 and 32 and the narrow road 33.

If a terminal position of the obtained reservation-requested route 11 of the own vehicle 20 interferes with a terminal position of the reservation-requested route 11 for the other vehicle 20, the terminal position of the reservation-requested route 11 for the other vehicle 20 is extended to a non-interference position (step 101).

(Already Reserved Route Generation Step; Step 102 in FIG. 2)

Then, for each of the vehicles 20A, 20B and 20C, it is judged that the reservation-requested route 11 for the own vehicle 20 does not interfere with the already reserved routes 12 for the other vehicles 20 and deadlock does not occur when it is assumed that the already reserved route 12, which has the reservation-requested route 11 for the own vehicle 20 already reserved, is generated. On condition that the above judgment has been made, processing is performed to generate the already reserved route 12, which has the reservation-requested route 11 for the own vehicle 20 already reserved. The already reserved route 12 is a route that is in the range of the reservation-requested route 11 and allowed to travel. The existing reservation-requested route 11 remains as it is, and the already reserved route 12, which has the same route as the route allowed in the existing reservation-requested route 11 already reserved, is generated.

If the reservation-requested route 11 for the own vehicle 20 interferes with the reservation-requested route 11 for the other vehicle 20, the already reserved route 12, which has the reservation-requested route 11 for the own vehicle 20 already reserved, is generated on condition that the own vehicle 20 has a priority higher than the other vehicle 20.

For example, as shown in FIG. 3B, if the reservation-requested route 11A for the own vehicle 20A interferes with the reservation-requested route 11C for the other vehicle 20C on the narrow road 33, the already reserved route 12A, which has the reservation-requested route 11A for the own vehicle 20A already reserved, is generated on condition that the own vehicle 20A has a priority higher than the other vehicle 20C.

The priority is determined sequentially depending on the state of the vehicle 20, the conditions of the travel road surface, and the like.

For example, the priority is determined in consideration of the following costs.

a) Cost depending on the state of vehicle 20
Loaded vehicle>empty vehicle
Uphill road>downhill road That is, a cargo-loaded vehicle 20 has a priority over a non-loaded vehicle 20, and a vehicle 20 travelling along an uphill road has a priority over a vehicle 20 traveling along a downhill road.

b) Fuel cost and tire wear-out cost
Stop inducing long waiting time>stop inducing short waiting time>deceleration required>deceleration not required That is, the priority is increased in order of a vehicle 20 not required to decelerate, a vehicle 20 required to decelerate, a vehicle 20 required to make a stop which induces a short waiting time, and a vehicle 20 required to make a stop which induces a long waiting timed. But, if already stopped (vehicle 20C in FIG. 3C) to wait for the other vehicle, comparison is made with a waiting time increment. That is, work efficiency is improved considering the stop times of the own vehicle and the other vehicle. It is general that the work efficiency of the whole system is considered to decide the order of travelling the vehicles along the narrow road.

Figure 6A:
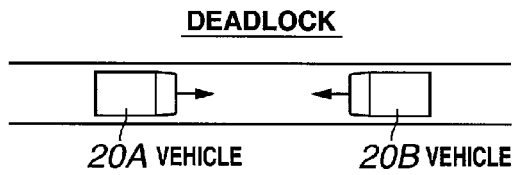
FIGS. 6A, 6B, 6C, 6D, 6E and 6F are diagrams used to explain a deadlock state.
Figure 6B:
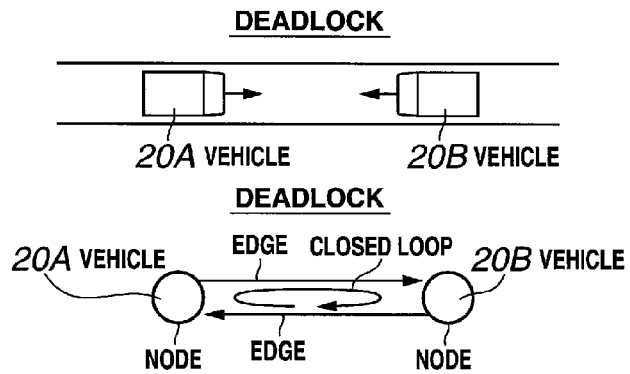
Figure 6C:
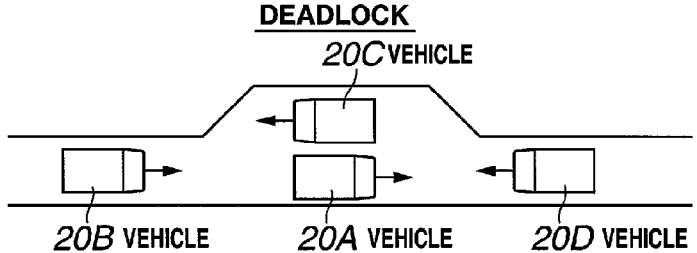
Figure 6D:
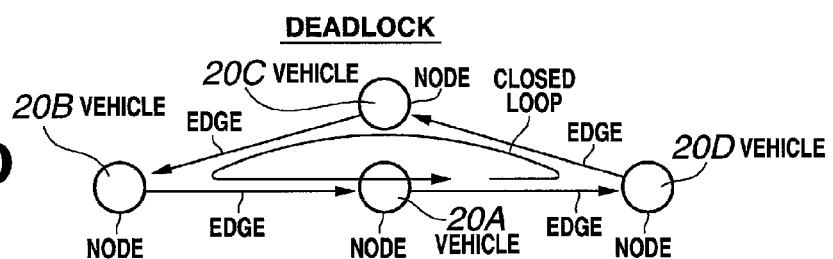
Figure 6E:
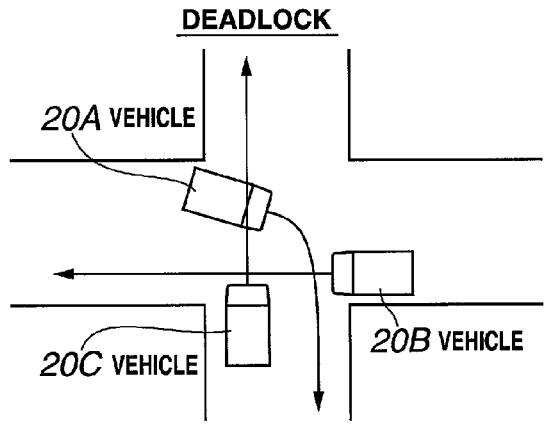
Figure 6F:
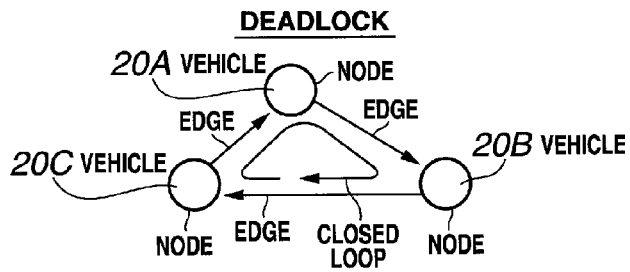

Judgment whether or not deadlock occurs is made by a mathematical model using known "graph theory". FIGS. 6A, 6B, 6C, 6D, 6E and 6F are diagrams to explain the deadlock. FIGS. 6A and 6B are a top view and its mathematical model in a case that the vehicle 20A and the vehicle 20B face to each other on a narrow road (alternate one-way traffic section where two-way traffic is impossible). FIGS. 6C and 6D are a top view and its mathematical model in a case that the vehicles 20A and 20B and the vehicles 20C and 20D are faced to each other on a narrow road (alternate one-way traffic section where two-way traffic is impossible) near a turnout (place where two-way traffic is possible). FIGS. 6E and 6F are a top view and its mathematical model in a case that the vehicles 20A, 20B and 20C enter an intersection from different directions to go in different directions.

The deadlock is judged by producing a mathematical model by the following procedure.

a) Respective vehicles 20A, 20B . . . are determined as nodes.

b) Edges having an arrow directed to the other vehicle which disturbs the own vehicle from moving are drawn to generate a directed graph with the nodes connected by the edges. But, multiple edges should not be drawn.

c) As a result, it is judged that deadlock occurs when the directed graph has a closed loop, namely when the directed graph is a multiple graph.

d) On the other hand, it is judged that deadlock does not occur when the directed graph does not have a closed loop, namely when the directed graph is a simple graph.

In the respective examples of FIGS. 6A, 6B, 6C, 6D, 6E and 6F, it is judged that the directed graph has a closed loop (FIGS. 6B, 6D and 6F) and deadlock occurs in all of them.

This deadlock judgment method is applied to this embodiment as follows.

Specifically, it is assumed that the already reserved route 12, which has the reservation-requested route 11 for the own vehicle 20 to be allowed to travel already reserved, is generated. A directed graph of an arrow, which is directed from the vehicle 20 for which the reservation-requested route 11 is generated toward the vehicle 20 for which the already reserved route 12 interfering (overlapping) with the reservation-requested routes 11 is generated, is generated, and it is judged whether or not deadlock occurs depending on whether the generated directed graph has a closed loop.

The judgment of the deadlock in this embodiment is performed by generating a mathematical model by the following procedure.

a) Respective vehicles 20A, 20B . . . are determined as nodes.

b) It is assumed that the already reserved route 12, which has the reservation-requested route 11 for the own vehicle 20 to be allowed to travel already reserved, is generated.

c) A directed graph having the nodes connected by the edges is generated by drawing the edges having an arrow, which is directed from the vehicle 20 for which the reservation-requested route 11 is generated toward the other vehicle 20 for which the already reserved route 12 interfering (overlapping) with the reservation-requested routes 11 is generated.

d) As a result, it is judged that deadlock occurs when the directed graph has a closed loop, namely when the directed graph is a multigraph. In this case, the temporarily determined already reserved route 12 is cancelled.

e) On the other hand, it is judged that deadlock does not occur when the directed graph does not have a closed loop, namely when the directed graph is a simple graph.

FIGS. 7A and 7B show mathematical models corresponding to the states of FIGS. 3B and 3C, namely directed graphs. In FIGS. 7A and 7B, since there is no other vehicle traveling in front of the traveling vehicle 20B as shown in FIGS. 3B and 3C, there is not an edge directed from the vehicle 20B to the other vehicle.

In the state of FIG. 3B, it is judged that deadlock does not occur because the directed graph does not have a closed loop as shown in FIG. 7A.

On the other hand, in the state of FIG. 3C, the directed graph has a closed loop as shown in FIG. 7B, and it is judged that deadlock occurs. Specifically, when a travel instruction is given to the vehicles 20A and 20C to allow them to travel along the already reserved routes 12A and 12C in FIG. 3C, the vehicle 20A and the vehicle 20C are faced to each other on the narrow road 33 to cause deadlock.

Thus, when it is judged whether deadlock occurs after the control device 40 generates the already reserved route 12A for the vehicle 20A and sends the travel instruction to the vehicle 20A to cause it travel along the already reserved route 12A, deadlock occurs actually. Therefore, according to the present invention, as shown in FIG. 3C, "if" the already reserved route 12A for the vehicle 20A is generated, and when it is judged that deadlock occurs as a result, the already reserved route 12A is cancelled to return to the state having only the original reservation-requested route 11A.

And, when it is judged by the control device 40 that the reservation-requested route 11 for the own vehicle 20 interferes with the already reserved route 12 for the other vehicle 20, it is possible to request the other vehicle 20 to return to the state to have the reservation-requested route 11 only by cancelling the already reserved route 12 for the other vehicle 20 for the above interfered portion. In this case, it can be requested to the other vehicle 20 that, for example, the other vehicle 20 stops at a position before the position interfering with the reservation-requested route 11 for the own vehicle 20.

For example, in the case where a route including the intersections 31 and 32 is to be generated in the already reserved route 12A on the reservation-requested route 11A for the own vehicle 20A in FIG. 3B, it can be demanded to the other vehicle 20B that the already reserved route 12B for the other vehicle 20B is cancelled for the regions of the intersections 31 and 32 to return to the state having the reservation-requested route 11B only. For example, it can be demanded to the other vehicle 20B that the other vehicle 20B stops at a position before the intersections 31 and 32.

Figure 8A:
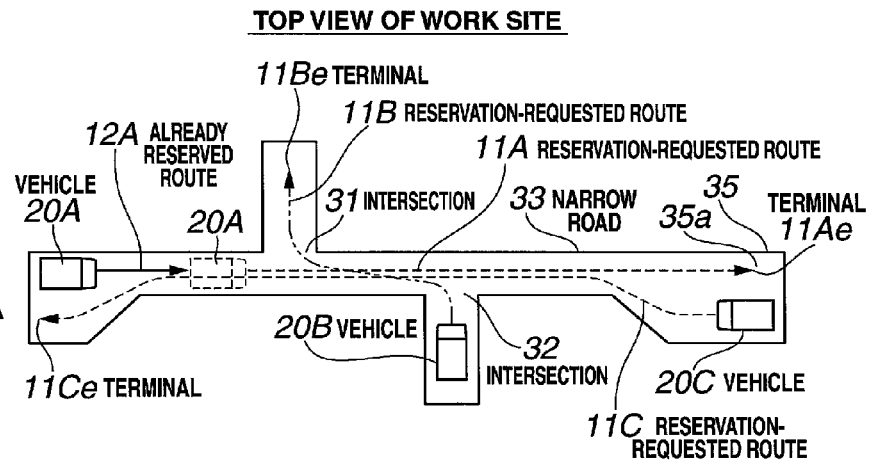
FIGS. 8A and 8B are diagrams corresponding to FIG. 3B, and FIGS. 8C and 8D are diagrams corresponding to FIGS. 4A and 4B, respectively.

As a result, if the above demand is realizable, the already reserved route 12B for the other vehicle 20B is cancelled to return to the state having the reservation-requested route 11B only, and the state of FIG. 3B becomes the state shown in FIG. 8A. Thus, the own vehicle 20A becomes free from a possibility of interfering with the other vehicle 20B at the intersections 31 and 32, and as shown in FIG. 8B, the already reserved route 12A having the whole of the reservation-requested route 11A reserved already is reserved, and it becomes possible to travel to the terminal position 11A$e$ (step 102).

(Travel Control Step; Step 103 in FIG. 2)

Then, the respective vehicles 20A, 20B and 20C are controlled to travel from the current positions to the terminal positions 11A$e$, 11B$e$ and 11C$e$ of the already reserved routes 12A, 12B and 12C.

Figure 8B:
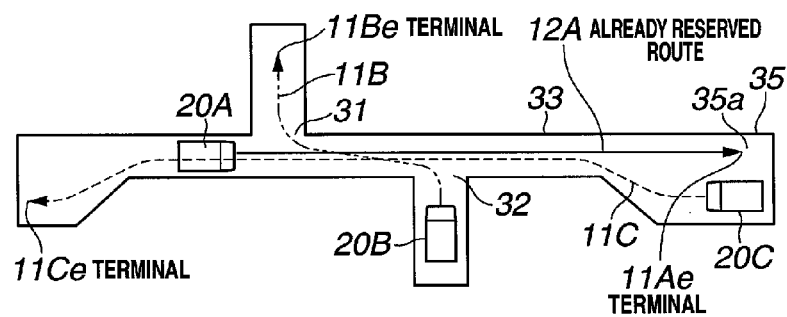

For example, when the already reserved route 12A is generated for the vehicle 20A as shown in FIG. 8B, information on the already reserved route 12A and a travel instruction are transmitted from the monitoring device 40 to the vehicle 20A. Thus, the vehicle 20A travels from the current position to the terminal position 11A$e$ along the already reserved route 12A (step 103).

Figure 9:
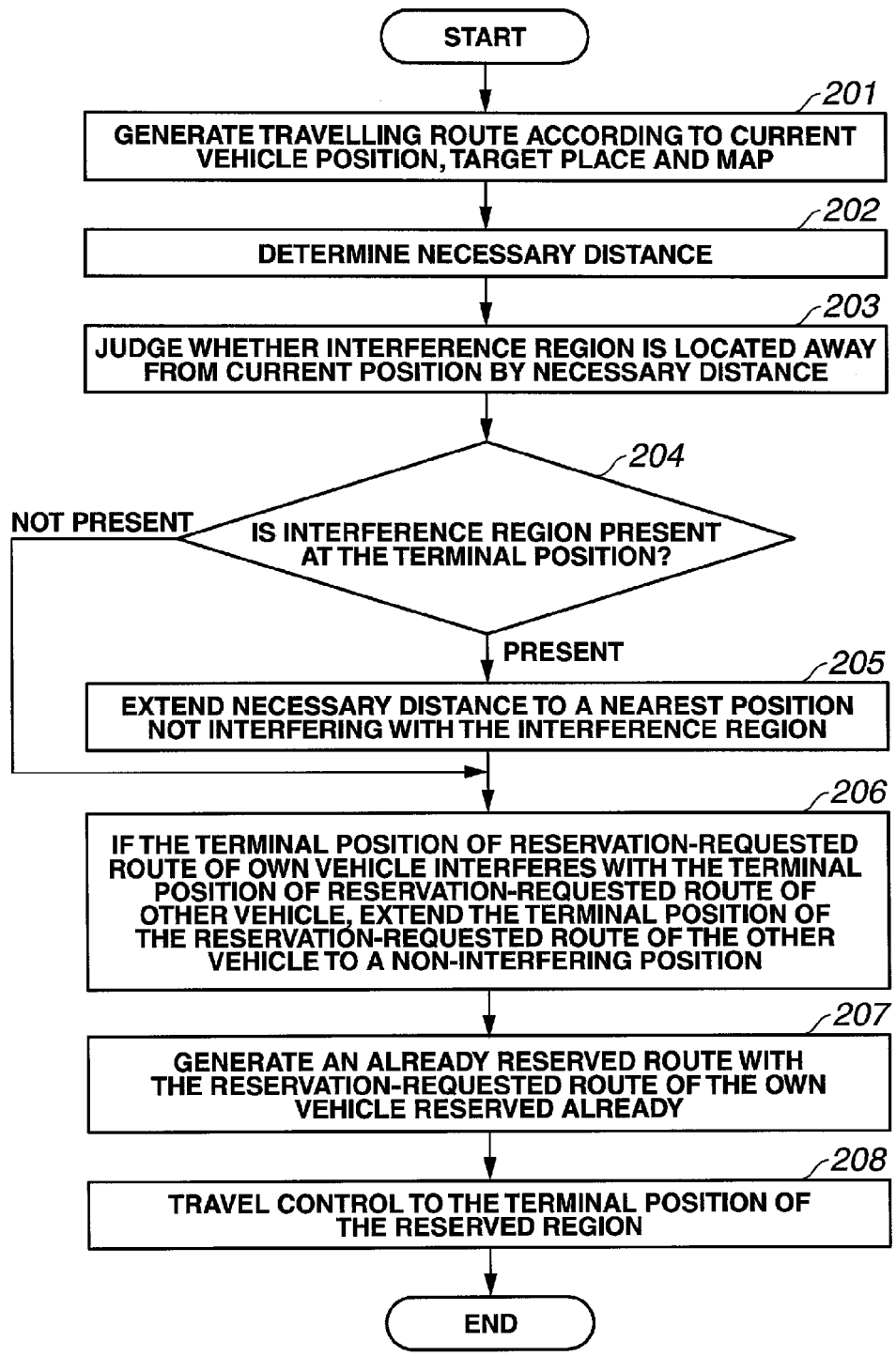
FIG. 9 is a flow chart used to explain a first embodiment and shows a procedure of processing performed by the control device.

Then, the first embodiment is described in further detail with additional reference to the flow chart shown in FIG. 9.

FIG. 9 is a flow chart showing a procedure of processing performed by the control device 40.

Steps 201 to 206 in FIG. 9 correspond to the "reservation-requested route generation step", step 207 corresponds to the "already reserved route generation step", and step 208 corresponds to the "travel control step".

In the following description, it is determined that the vehicle to be allowed to travel is the "own vehicle", the "own vehicle" is the vehicle 20A, and the "other vehicles" are the vehicle 20B and the vehicle 20C unless otherwise specified. Therefore, the following processing is similarly performed even when the "own vehicle" is the vehicle 20B or the vehicle 20C.

(Reservation-Requested Route Generation Step)

First, the travel route 10A where the vehicle 20A must travel is generated according to the current position and the destination of the vehicle 20A, and the map of the work site 30. Here, the travel route may not be necessarily an accurate travel path but may be a rough route such as "certain intersection→another intersection→loading place" (step 201).

Then, a distance required to keep travelling from the current position of the vehicle 20A, namely the above-described "necessary distance" is determined (step 202).

Then, it is judged whether or not the interference region on the map is present at a terminal position separated from the current position on the travel route 10A by a necessary distance (step 203).

As a result, when it is judged that the interference region on the map does not exist at the terminal position (judged "Not present" in step 204), the procedure moves to step 206 without performing the processing of the next step 205, but when it is judged that the interference region on the map is present at the terminal position (judged "Present" in step 204), the procedure moves to the next step 205.

In the step 205, the necessary distance is extended so that the terminal position is not positioned at the interference region on the map. Specifically, the necessary distance is extended on the travel route 10A from the current terminal position to a position which is in the nearest distance and does not interfere with the interference region on the map. For example, in FIG. 3B, when it is assumed that the terminal position of the necessary distance for the vehicle 20A is originally determined in the intersection 32 by calculating from the necessary distance, the necessary distance is extended to a terminal 35a of a wide road 35 (path where two-way traffic is possible), which is a point immediately after passing through the interference region such as the intersection 32 or the narrow road 33 on the map, and determined as the terminal position 11Ae (step 205).

Then, it is judged whether or not the terminal position of the reservation-requested route 11A for the own vehicle 20A interferes with the terminal positions of the reservation-requested routes 11B and 11C for the other vehicles 20B and 20C, and if there is interference, the terminal positions of the reservation-requested routes 11B and 11C for the other vehicles 20B and 20C are extended to a non-interference position (step 206).

Figure 10:
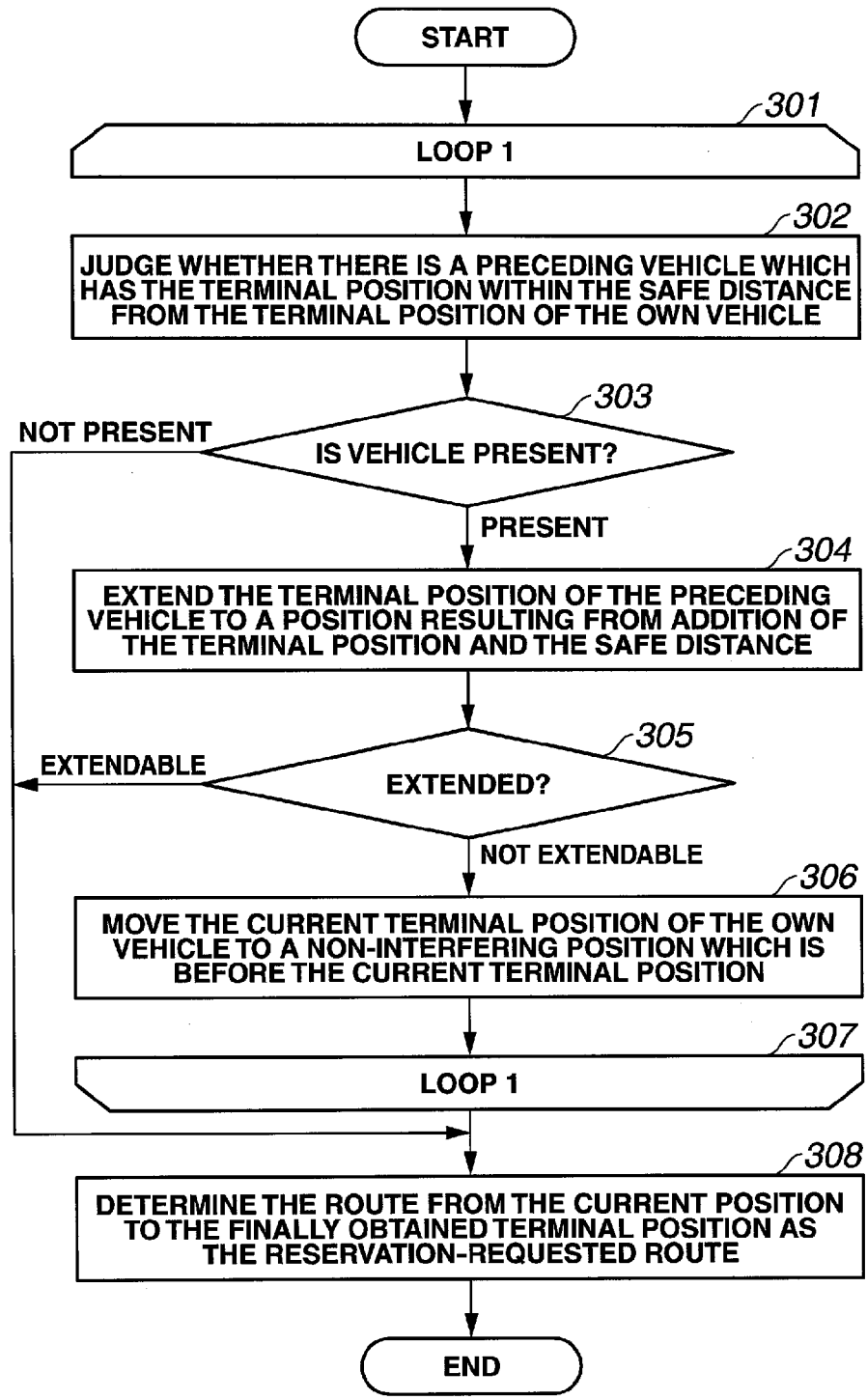
FIG. 10 is a flow chart showing a procedure of specific processing by step 206 of FIG. 9.

The processing of step 206 is shown in FIG. 10.

In FIG. 10, processing of "loop 1" is equivalent to the processing of step 301 to step 307.

Specifically, the processing of "loop 1" is started first (step 301), and the processing of steps 302 to 306 is repeated until the procedure leaves the "loop 1" in step 303 or step 305 (step 307).

When the processing of "loop 1" is started, it is judged whether there is a preceding vehicle which has as the terminal position of the reservation-requested route a position in a range of the safe distance from the terminal position of the reservation-requested route 11A for the own vehicle 20A. Here, the safe distance is a distance from the terminal position calculated to an actually stopped position including an allowance, and it is a distance that the own vehicle 20A can stop safely with no interference with the preceding vehicle. The safe distance can be determined by adding a predetermined inter-vehicular distance to a control tolerance. The preceding vehicle is not only a vehicle which is travelling in the same direction and in front of the own vehicle 20A, but also a vehicle which edges its way into traffic and in front of the travelling own vehicle 20A by joining traffic at an intersection, reversing, switchbacking, or the like (step 302).

As a result, when it is judged that there is not a preceding vehicle which has a position in a range of safe distance from the terminal position of the reservation-requested route 11A for the own vehicle 20A determined as the terminal position of the reservation-requested route (judged "Not present" in step 303), the procedure leaves the "loop 1" and moves to step 308.

On the other hand, when it is judged that there is a preceding vehicle which has a position in a range of safe distance from the terminal position of the reservation-requested route 11A for the own vehicle 20A as a terminal position of the reservation-requested route (judged "Present" in step 303), extension is made by a safe distance to the terminal position of the reservation-requested route for the preceding vehicle. That is, a position separated from the current terminal position of the reservation-requested route for the preceding vehicle by a safe distance in the traveling direction of the own vehicle 20A is determined as a new terminal position of the reservation-requested route for the preceding vehicle (step 304).

The same processing (steps 201 to 206 in FIG. 9) as that for the own vehicle 20A is performed on the vehicle (20B etc.) which precedes the own vehicle 20A to determine the terminal position of its reservation-requested route. Therefore, the terminal position of the reservation-requested route for the preceding vehicle might not be extended for a safe distance only. For example, there are a case that a distance from the preceding vehicle 20 is close, and a case that the other vehicle 20 is coming closer from the right side of the own vehicle 20 at an intersection. Therefore, it is judged whether or not the terminal position of the reservation-requested route for the preceding vehicle could be extended for a safe distance only (step 305), and if the terminal position of the reservation-requested route for the preceding vehicle could be extended for the safe distance as a result (judged "Extendable" in step 305), the procedure leaves the "loop 1" and moves to step 308. On the other hand, if the terminal position of the reservation-requested route for the preceding vehicle could not be extended for the safe distance (judged "Not extendable" in step 305), the terminal position of the reservation-requested route for the preceding vehicle is not extended but kept as it is, and the terminal position of the reservation-requested route 11A for the own vehicle 20A is moved to a position separated from the terminal position of the reservation-requested route for the preceding vehicle by the safe distance or more and also before the position in the interference region on the map (step 306).

Thus, when the terminal position of the reservation-requested route 11A for the own vehicle 20A is updated, the processing of "loop 1" is repeatedly performed on the updated terminal position. As a result of the judgment in step 303 or step 305, the procedure leaves the "loop 1", and the obtained terminal position is finally determined as the terminal position 11Ae of the reservation-requested route 11A for own vehicle 20A (step 308).

(Already Reserved Route Generation Step)

When the reservation-requested route 11A for the own vehicle 20A is generated as described above, then, in the range of the reservation-requested route 11A, the already reserved region 12A, which has the longest route satisfying the following conditions already reserved, is generated.

a) The reservation-requested route 11A for the own vehicle 20A should not interfere with the already reserved routes 12B and 12C for the other vehicles 20B and 20C;

b) deadlock should not occur when it is assumed that the already reserved route 12A, which has the reservation-requested route 11A for the own vehicle 20A already reserved, is generated; and c) when the reservation-requested route 11A for the own vehicle 20A interferes with the reservation-requested routes 11B and 11C for the other vehicles 20B and 20C, the own vehicle 20A should have a priority higher than the other vehicles 20B and 20C (step 207).

Figure 11:
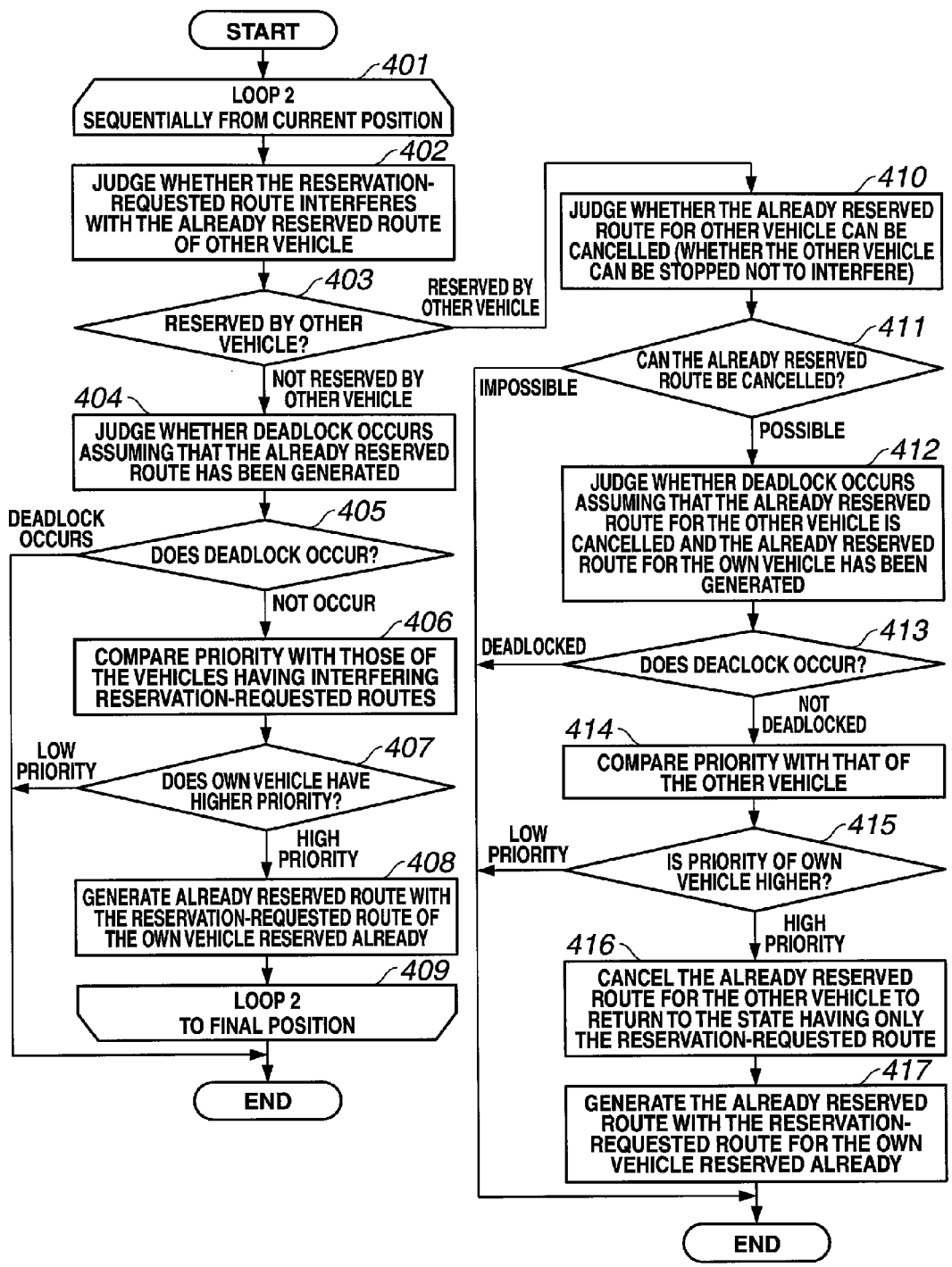
FIG. 11 is a flow chart showing a procedure of specific processing by step 207 of FIG. 9.

Processing of step 207 is shown in FIG. 11.

That is, processing of the "loop 2" is started (step 401), and processing of steps 402 to 408 is repeated until the procedure leaves the "loop 2" at step 403, step 405 or step 407 or reaches a termination condition. When the procedure leaves the "loop 2" in step 403, processing of steps 410 to 417 is performed.

In the "loop 2", it is verified sequentially from the current position whether or not the already reserved route 12A should be reserved with respect to the reservation-requested route 11A for the own vehicle 20A.

When processing of the "loop 2" is started, it is judged whether or not the reservation-requested route 11A for the own vehicle 20A interferes with the already reserved routes 12B and 12C for the other vehicles 20B and 20C (step 402).

As a result, when it is judged that the reservation-requested route 11A for the own vehicle 20A interferes with the already reserved routes 12B and 12C for the other vehicles 20B and 20C (judged "Reserved by the other vehicle" in step 403), the procedure leaves the "loop 2" and moves to step 410.

On the other hand, when it is judged that the reservation-requested route 11A for the own vehicle 20A does not interfere with the already reserved routes 12B and 12C for the other vehicles 20B and 20C (judged "Not reserved by the other vehicle" in step 403), the procedure moves to the next step 404 in the "loop 2".

In step 404, it is judged whether or not deadlock occurs assuming that the already reserved route 12A, which has the reservation-requested route 11A for the own vehicle 20A already reserved, is generated (step 404).

As a result, when it is judged that deadlock occurs (judged "Deadlock occurs" in step 405), the procedure leaves the "loop 2", the processing of FIG. 11 is ended. For example, in the state of FIG. 3C, it is judged that deadlock occurs because the directed graph has a closed loop as shown in FIG. 7B. That is, the own vehicle 20A and the other vehicle 20C are faced to each other on the narrow road 33 to have deadlock in FIG. 3C. Thus, the already reserved route 12A, which is generated assuming that the reservation-requested route 11A has been reserved, is cancelled to return to the original state with the reservation-requested route 11A only, and a step is taken to cause the own vehicle 20A to wait at the current position. Here, waiting means that the vehicle stops and waits for the other vehicle 20 to pass by.

On the other hand, when it is judged that deadlock does not occur (judged "Not occur" in step 405), the procedure moves to the next step 406 in the "loop 2".

In step 406, if the reservation-requested route 11A for the own vehicle 20A interferes with the reservation-requested routes 11B and 11C for other vehicles 20B and 20C, it is judged whether or not the own vehicle 20A has a priority higher than those of the other vehicles 20B and 20C (step 406). As a result, if it is judged that the priority of the own vehicle 20A is low (judged "Low priority" in step 407), the procedure leaves the "loop 2", and the processing of FIG. 11 is ended. For example, if the reservation-requested route 11A for the own vehicle 20A interferes with the reservation-requested route 11C for the other vehicle 20C on the narrow road 33 as shown in FIG. 3B, a step is taken to cause the own vehicle 20A to wait at the current position if the own vehicle 20A has a priority lower than the other vehicle 20C.

On the other hand, if it is judged that the priority of the own vehicle 20A is high (judged "High priority" in step 407), the already reserved route 12A, which has the reservation-requested route 11A for the own vehicle 20A already reserved, is generated. Thus, for example, as shown in FIG. 3B, the already reserved route 12A, which has the reservation-requested route 11A already reserved, is generated within a section from the current position of the own vehicle 20A to a position before the intersection 31, and a travel along the already reserved route 12A is approved (step 408).

After that, the processing of the "loop 2" is sequentially performed repeatedly on portions, where the already reserved route 12A has not been generated, in the reservation-requested route 11A for the own vehicle 20A. When the already reserved route 12A is generated to a final point of the reservation-requested route 11A for the own vehicle 20A, a termination condition of the "loop 2" is met, and the processing of "loop 2" is ended. For example, when deadlock does not occur as shown in FIG. 8A and the priority of the own vehicle 20A is high, the already reserved route 12A, which has the whole of the reservation-requested route 11A for the own vehicle 20A already reserved, is generated as shown in FIG. 8B, and the own vehicle 20A becomes possible to travel to the terminal position 11Ae of the reservation-requested route 11A.

Meanwhile, when it is judged in step 403 in the process of the "loop 2" that the reservation-requested route 11A for the own vehicle 20A interferes with the already reserved routes 12B and 12C for the other vehicles 20B and 20C (judged "Reserved by the other vehicle" in step 403), the procedure leaves the "loop 2" and moves to step 410.

In step 410 and following, for portions where the reservation-requested route 11A for the own vehicle 20A interferes with the already reserved routes 12B and 12C for the other vehicles 20B and 20C, processing is performed to demand the other vehicles 20B and 20C that the already reserved routes 12B and 12C for the other vehicles 20B and 20C are cancelled to return to the state to have the reservation-requested routes 11B and 11C only. And, on conditions that deadlock does not occur and the priority of the own vehicle 20A is high, processing is performed to cancel the already reserved routes 12B and 12C for the other vehicles 20B and 20C to return to the state to have the reservation-requested routes 11B and 11C only and to generate the already reserved route 12A, which has the reservation-requested route 11A for the own vehicle 20A already reserved.

In step 410, for portions where the reservation-requested route 11A for the own vehicle 20A interferes with the already reserved routes 12B and 12C for the other vehicles 20B and 20C, it is judged whether or not the already reserved routes 12B and 12C for the other vehicles 20B and 20C can be cancelled to return to the state having the reservation-requested routes 11B and 11C only (step 410). As a result, when it is judged that the already reserved route cannot be cancelled, (judged "Impossible" in step 411), the processing of FIG. 11 is ended. Thus, for example, a step is taken to cause the own vehicle 20A to wait at the current position.

On the other hand, if it is judged that the already reserved route can be cancelled (judged "Possible" in step 411), the already reserved routes 12B and 12C for the other vehicles 20B and 20C are cancelled to return to the state having the reservation-requested routes 11B and 11C only, and it is judged whether or not deadlock occurs assuming that the already reserved route 12A, which has the reservation-requested route 11A for the own vehicle 20A already reserved, is generated (step 412). As a result, when it is judged that deadlock occurs (judged "Deadlock occurs" in step 413), the processing of FIG. 11 is ended. Thus, the already reserved route 12A, which is generated assuming that the reservation-requested route 11A has been reserved, is cancelled to return to the state having the original reservation-requested route 11A only, and the temporary generated reservation-requested routes 11B and 11C are cancelled to return to the state having the original already reserved routes 11B and 11C only, and for example, a step is taken to cause the own vehicle 20A to wait at the current position.

On the other hand, if it is judged that deadlock does not occur (judged "Not deadlocked" in step 413), it is then judged whether or not the own vehicle 20A has a priority higher than the other vehicles 20B and 20C (step 414). As a result, if it is judged that the priority of the own vehicle 20A is low (judged "Low priority" in step 415), the processing of FIG. 11 is ended. Thus, for example, a step is taken to cause the own vehicle 20A to wait at the current position.

On the other hand, when it is judged that the priority of the own vehicle 20A is high (judged "High priority" in step 415), for portions where the reservation-requested route 11A for the own vehicle 20A interferes with the already reserved routes 12B and 12C for the other vehicles 20B and 20C, a step is taken to cancel the already reserved routes 12B and 12C for the other vehicles 20B and 20C to return to the state having the reservation-requested routes 11B and 11C only. Thus, the already reserved routes 12B and 12C for the other vehicles 20B and 20C are cancelled to return to the state having the reservation-requested routes 11B and 11C only (step 416). On the other hand, the already reserved route 12A, which has the reservation-requested route 11A for the own vehicle 20A already reserved, is generated (step 417). For example, in FIG. 3B, when the already reserved route 12A, which has the route including the intersections 31 and 32 already reserved, is generated in the reservation-requested route 11A for the own vehicle 20A, the other vehicle 20B is demanded to stop at a position before the intersections 31 and 32. As a result, if the demand to stop the other vehicle 20B is realizable considering the current vehicle speed and the distance to the stopping position, the already reserved route 12B for the other vehicle 20B is cancelled to return to the state having the reservation-requested route 11B only, and the state of FIG. 3B becomes the state shown in FIG. 8A. Judgment whether or not the demand to stop the other vehicle 20B is realizable is made by the processing device 22 of the vehicle 20B. It is judged by the processing device 22 whether or not it is possible to stop by normal deceleration, and when it is judged as stoppable as a result, a signal indicating "Stoppable" is sent from the vehicle 20B to the control device 40. The control device 40 having received it cancels the already reserved route 12B for the other vehicle 20B and performs processing to return to the state having the reservation-requested route 11B only.

Thus, the own vehicle 20A becomes free from having a possibility of interference with the other vehicle 20B at the intersections 31 and 32, and as shown in FIG. 8B, the already reserved route 12A, which has the whole of the reservation-requested route 11A already reserved, can be generated. As a result, the own vehicle 20A becomes possible to travel to the terminal position 11A*e* of the reservation-requested route 11A.

(Travel Control Step)

Thus, when the already reserved route 12A for the vehicle 20A is generated, the vehicle 20A is controlled to travel from the current position to the terminal position 11A*e* of the already reserved route 12A. For example, when the already reserved route 12A is generated for the vehicle 20A as shown in FIG. 8B, information on the already reserved route 12A and the travel instruction are transmitted from the monitoring device 40 to the vehicle 20A. Thus, the vehicle 20A travels from the current position to the terminal position 11A*e* along the already reserved route 12A. The other vehicles 20B and 20C are also undergone the same processing, and the respective vehicles 20B and 20C also travel from the current positions to the terminal positions 11B*e* and 11C*e* along the already reserved routes 12B and 12C (step 208).

As described above, deadlock is avoided without fail according to this embodiment, so that a plurality of vehicles can be caused to travel with good work efficiency at the work site without having deadlock. In addition, the stop time of the vehicles can be reduced, and work efficiency is improved.

Second Embodiment

FIG. 4A is an explanatory view of a second embodiment.

FIG. 4A shows a region of the work site 30 different from FIG. 3 and shows as a top view a state that three vehicles 20A, 20B and 20C travel along respective travel routes. FIG. 4A shows a case that travel routes for the vehicles 20A, 20B and 20C coexist on a narrow road 34, namely an alternate one-way traffic section 34 where two-way traffic is impossible. The vehicles 20A and 20B each travel in the same direction along the travel routes (right direction in the drawing), and the vehicle 20C travels in an opposite direction (left direction in the drawing) along the travel route.

The interference region on the map according to the second embodiment is the narrow road (alternate one-way traffic section where two-way traffic is impossible) 34 shown in FIG. 4A.

In the second embodiment, the same processing as in the flow charts of the first embodiment shown in FIG. 2, FIG. 9, FIG. 10 and FIG. 11 is performed by the same procedure.

(Reservation-Requested Route Generation Step)

In the second embodiment, the reservation-requested routes 11 are routes that are parts of the travel routes 10 and between the current positions and the travel stop positions and that are generated in such a manner that a position not interfering with an interference region shown on a map and the terminal position of the reservation-requested route 11 for the other vehicle 20 becomes a terminal. And, when the terminal position which is separated from the current position on the travel route 10 by a necessary distance is positioned in the interference region on the map, the necessary distance is extended so that the terminal position is not located in the interference region on the map. Thus, as shown in FIG. 4A, reservation-requested routes 11A, 11B and 11C for the vehicles 20A, 20B and 20C are determined such that the terminal position is not positioned on the narrow road 34.

In FIG. 4A, when the terminal position of the reservation-requested route 11A for the own vehicle 20A interferes with the terminal position of the reservation-requested route 11B for the other vehicle 20B which precedes the own vehicle 20A, a new terminal position is determined by extending the terminal position of the reservation-requested route 11B for the other vehicle 20B to the non-interference position.

Figure 8C:
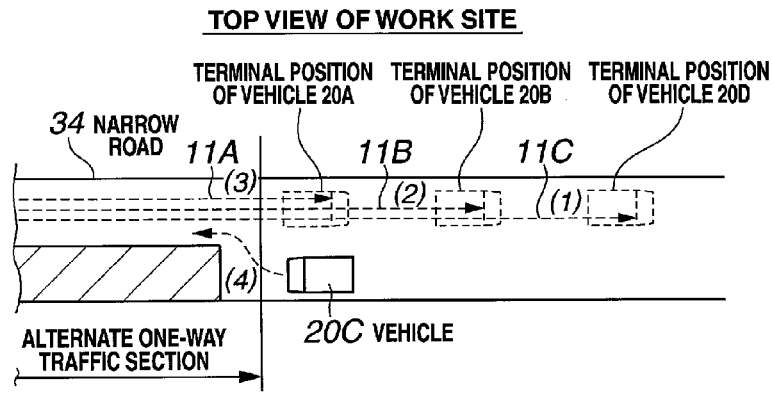

At this time, as shown in step 304 of FIG. 10, the terminal position of the preceding vehicle is extended to a position which is a safe distance away from the terminal position. That is, it is assumed as shown in FIG. 8C that a further preceding vehicle 20D is traveling ahead of a preceding vehicle 20B traveling forward. First, it is determined that the terminal position of the reservation-requested route 11D for the vehicle 20D is within the range of the safe distance from the terminal position of the reservation-requested route 11B for the preceding vehicle 20B. In this case, the preceding vehicle 20B also becomes the "own vehicle", and the processing shown in FIG. 10 is performed, so that the extension of the terminal position of the reservation-requested route 11B for the vehicle 20B preceding the vehicle 20A, and the extension of the terminal position of the reservation-requested route 11D for the vehicle 20D preceding the vehicle 20B are sequentially performed (step 304).

(Already Reserved Route Generation Step)

As shown in FIG. 4A, when the reservation-requested routes 11A and 11B for the own vehicles 20A and 20B interfere with the reservation-requested route 11C for the other vehicle 20C on the narrow road 34, the already reserved routes 12A and 12B, which have the reservation-requested routes 11A and 11B for the own vehicles 20A and 20B already reserved, are generated on conditions that the own vehicles 20A and 20B have a priority higher than the other vehicle 20C.

(Travel Control Step)

Thus, when the already reserved routes 12A and 12B for the vehicles 20A and 20B are generated, the vehicles 20A and 20B are controlled to travel from the current positions to the terminal position of the already reserved route 12A. Other vehicles are also controlled to travel in the same manner.

As a result, as shown in FIG. 4A and FIG. 8C, it becomes possible to travel the vehicle 20B and the vehicle 20A simultaneously or the vehicles 20D, 20B and 20A simultaneously while following the preceding vehicle. Thus, the vehicle 20B and the vehicle 20A, or the vehicles 20D, 20B and 20A are caused to travel simultaneously in one direction, and then the vehicle 20C can be caused to travel alternately from the other direction (traveling order is indicated by (1), (2) and (3) or (1), (2), (3) and (4) in the drawing).

Points with work efficiency improved are explained with reference to FIG. 4A and FIG. 8C of the second embodiment and FIG. 4B and FIG. 8D of comparative examples.

Figure 8D:
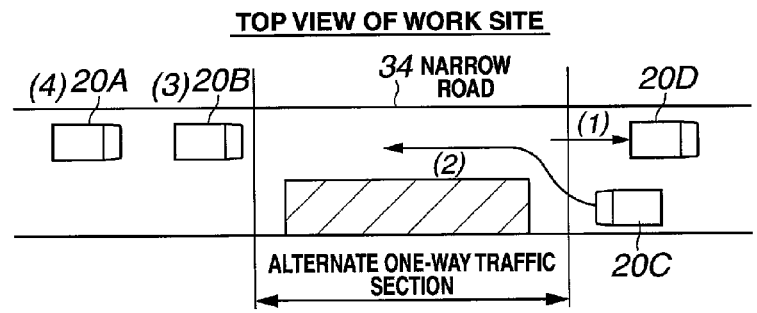

Conventionally, when alternate one-way traffic is performed, the vehicle 20D, the vehicle 20C, the vehicle 20B and the vehicle 20A are caused to travel alternately (travel order is indicated by (1), (2), (3) and (4) in the drawing) as shown in FIG. 8D. And, the vehicle 20B, the vehicle 20C and the vehicle 20A are caused to travel alternately (travel order is indicated by (1), (2) and (3) in the drawing) as shown in FIG. 4B.

On the other hand, the concept of the reservation-requested route 11 and the already reserved route 12 is introduced in the second embodiment to allow traveling along the longest route in a non-interference range and to prevent deadlock. Therefore, when the same alternate one-way traffic is performed, it becomes possible to cause the vehicle 20B and the vehicle 20A to travel simultaneously, or the vehicles 20D, 20B and 20A to travel simultaneously, while following the preceding vehicle as shown in FIG. 4A or FIG. 8C. Thus, the vehicle 20B and the vehicle 20A or the vehicles 20D, 20B and 20A are caused to travel simultaneously in one direction, and then the vehicle 20C can be caused to travel alternately from the other direction (traveling order is indicated by (1), (2) and (3) or (1), (2), (3) and (4) in the drawing). Thus, work efficiency is improved dramatically.

Figure 12B:
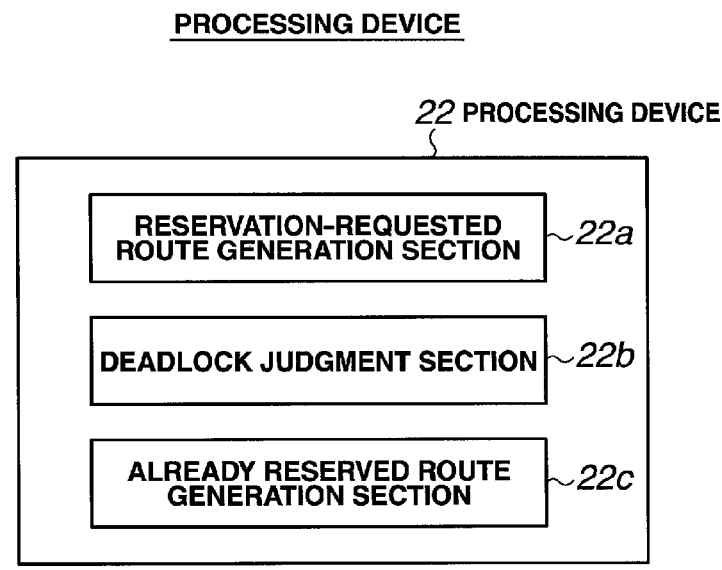

In the above-described first and second embodiments, it was described that the processing device 42 of the control device 40 is provided with a reservation-requested route generation section 42a, a deadlock judgment section 42b and an already reserved route generation section 42c to generate the reservation-requested routes 11 and the already reserved route 12. But, it may be configured as shown in FIG. 12B that the processing device 22 of the vehicle 20 is provided with a reservation-requested route generation section 22a, a deadlock judgment section 22b and an already reserved route generation section 22c as the same functions as above, and information is directly transmitted/received between the vehicles 20 and 20 mutually to generate the reservation-requested route 11 and the already reserved route 12 by the vehicles 20.

The invention claimed is:

1. A travel control apparatus for unmanned vehicles, which causes a plurality of unmanned vehicles to travel along respective travel routes, wherein:

for each of the plurality of unmanned vehicles, a reservation-requested route not allowed to travel that is a part of a travel route from a current position to a travel stop position is generated, and when an already reserved route as a route allowed to travel in a range of the reservation-requested route is generated, each of the plurality unmanned vehicles is controlled to travel from the current position to a terminal position of the already reserved route, the travel control apparatus comprising:

a reservation-requested route generation section which generates, for each of the plurality of unmanned vehicles, the reservation-requested route that is the part of travel route from the current position to the travel stop position and that has a position, as a terminal position, which does not interfere with an interference region on a map and is not a terminal position of the reservation-requested route for another vehicle, a deadlock judgment section which judges for each of the plurality of unmanned vehicles that the reservation-requested route for an own vehicle generated by the reservation-requested route generation section does not interfere with an already reserved route for the another vehicle, and that deadlock does not occur between the own vehicle and the another vehicle assuming that the already reserved route, in the range of the reservation-requested route for the own vehicle generated by the reservation-requested route generation section, is generated, that the assumed already reserved route is allowed to travel, and that the own vehicle travels to the terminal position of the assumed already reserved route, an already reserved route generation section which generates, for each of the plurality of unmanned vehicles, when the deadlock judgment section judges that deadlock does not occur between the own vehicle and the another vehicle, the already reserved route assumed to be allowed to travel in the range of the reservation-requested route for the own vehicle as the already reserved route allowed to travel, and a travel control section which controls each of the plurality of unmanned vehicles to travel from the current position to the terminal position of the already reserved route generated by the already reserved route generation section.

2. A travel control method for unmanned vehicles, which causes a plurality of unmanned vehicles to travel along respective travel routes, wherein:

for each of the plurality of unmanned vehicles, a reservation-requested route not allowed to travel that is a part of a travel route from a current position to a travel stop position is generated, and when an already reserved route as a route allowed to travel in a range of the reservation-requested route is generated, each of the plurality unmanned vehicles is controlled to travel from the current position to a terminal position of the already reserved route, comprising:

a reservation-requested route generation step of generating, for each of the plurality of unmanned vehicles, the reservation-requested route that is the part of the travel route from the current position to the travel stop position and that has a position, as a terminal position, which does not interfere with an interference region on a map and is not a terminal position of the reservation-requested route for another vehicle, an already reserved route generation step of generating, for each of the plurality of unmanned vehicles, an already reserved route assumed to be allowed to travel in the range of the reservation-requested route for an own vehicle as an already reserved route allowed to travel, on conditions that the reservation-requested route for the own vehicle generated in the reservation-requested route generation step does not interfere with an already reserved route for another vehicle, and that deadlock does not occur between the own vehicle and the another vehicle when it is assumed that the already reserved route, in the range of the reservation-requested route for the own vehicle, generated in the reservation-requested route generation step, is generated, that the assumed already reserved route is allowed to travel, and that the own vehicle travels to the terminal position of the assumed already reserved route, and a travel control step of controlling each of the plurality of unmanned vehicles to travel from the current position to the terminal position of the already reserved route generated in the already reserved route generation step.

3. The travel control method for unmanned vehicles according to claim 2, wherein:

in the already reserved route generation step, for each of the plurality of unmanned vehicles, when the reservation-requested route for the own vehicle interferes with the reservation-requested route for the another vehicle, the already reserved route, in the range of the reservation-requested route for the own vehicle, is generated on conditions that the own vehicle has a priority higher than the another vehicle.

4. The travel control method for unmanned vehicles according to claim 2, wherein:

in the already reserved route generation step, for each of the plurality of unmanned vehicles, it is assumed that the already reserved route has been generated in the range of the reservation-requested route for the own vehicle, a directed graph of an arrow directed from the vehicle, for which the reservation-requested route has been generated, to the vehicle, for which an already reserved route interfering with the reservation-requested route has been generated, is generated, and it is judged whether or not deadlock occurs depending on whether or not the generated directed graph has a closed loop.

5. The travel control method for unmanned vehicles according to claim 2, wherein:

in the already reserved route generation step, for each of the plurality of unmanned vehicles, when it is judged that the reservation-requested route for the own vehicle interferes with the already reserved route for the another vehicle, the another vehicle is demanded to cancel the interfered portion on the already reserved route for the another vehicle.

6. The travel control method for unmanned vehicles according to claim 5, wherein:

for each of the plurality of unmanned vehicles, when it is judged that the reservation-requested route for the own vehicle interferes with the already reserved route for the another vehicle, the another vehicle is demanded to stop at a position before a position where the another vehicle interferes with the reservation-requested route for the own vehicle.

7. The travel control method for unmanned vehicles according to claim 2, wherein:

in the reservation-requested route generation step, for each of the plurality of unmanned vehicles, when the terminal position of the reservation-requested route for the own vehicle interferes with the terminal position of the reservation-requested route for the another vehicle, the terminal position of the reservation-requested route for the another vehicle is extended to a non-interference position.

* * * * *